Nov. 15, 1955 J. A. RAJCHMAN ET AL 2,724,051

WAVE FORM GENERATOR

Filed April 20, 1953

INVENTORS

JAN A. RAJCHMAN &

RAYMOND STUART-WILLIAMS

BY Samuel Lindenberg

ATTORNEY

United States Patent Office 2,724,051

Patented Nov. 15, 1955

2,724,051

WAVE FORM GENERATOR

Jan A. Rajchman and Raymond Stuart-Williams, Princeton, N. J., assignors to Radio Corporation of America, a corporation of Delaware Application April 20, 1953, Serial No. 349,704

7 Claims. (Cl. 250—27)

Figures 1, 2:
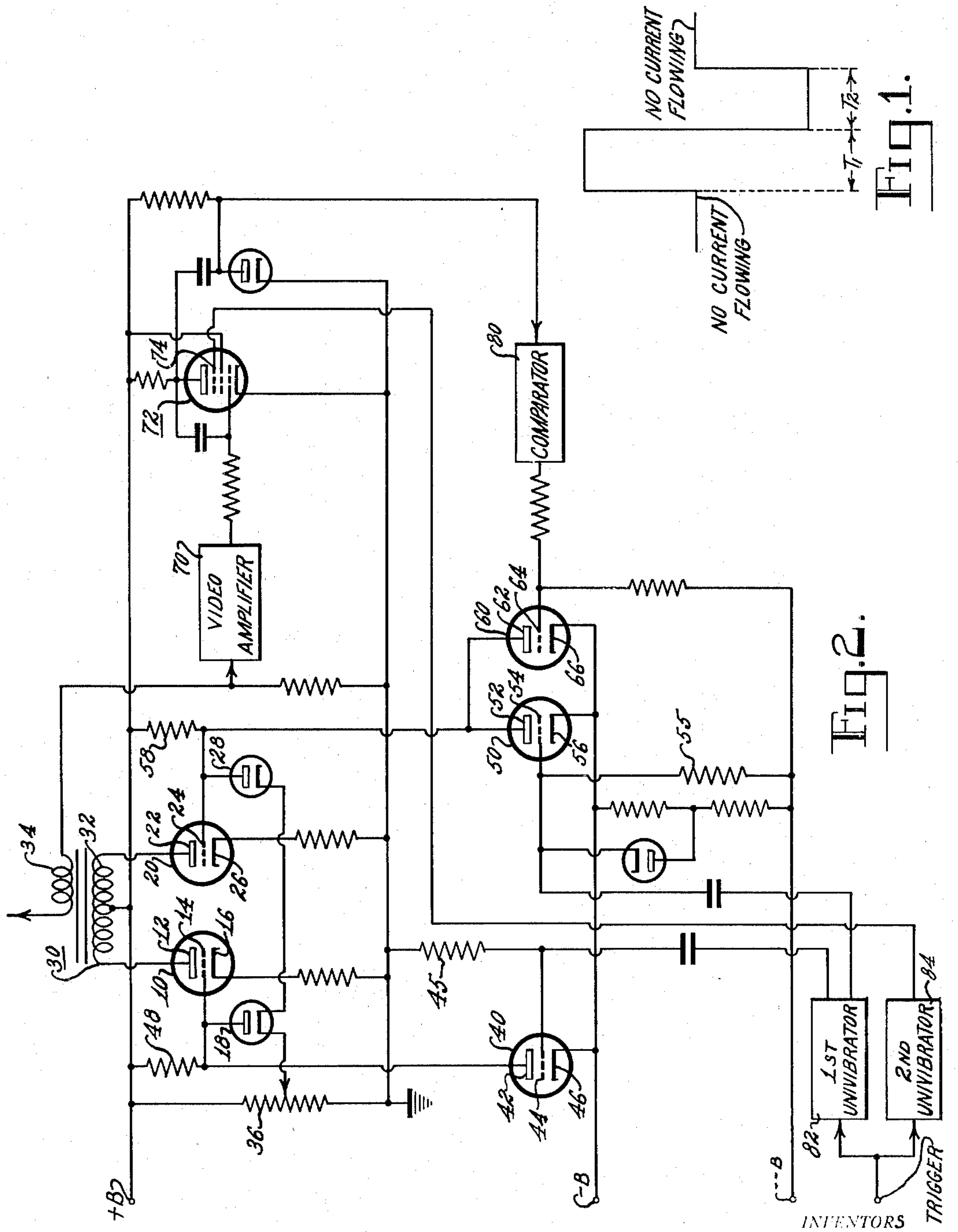

This invention is for a wave form generator, and more particularly for an electronic system for generating a wave form having a balanced wave shape.

In certain applications, it is required to drive a system such as a magnetic memory with a current wave form, consisting of two rectangular pulses following each other without any great time delay, the first pulse being of opposite polarity to the second pulse and the energy content of the positive pulse portion being exactly equal to the energy content of the negative pulse portion. Difficulty has been experienced in generating such a wave form, since the requirements are extremely precise. The wave form must be available whenever required, must start from a zero level, rise to its maximum height, maintain this height for a desired interval, then immediately drop past the zero level to its maximum negative height. Obviously, to gate the output of an oscillator would not guarantee that the wave form at the desired gating instant would commence at the zero level. To use the wave forms from blocking oscillators and the like also does not insure the complete equality of the positive and negative portions of the output. The "shock" excitation of a tuned circuit can provide an output at a desired interval, but the two halves of the wave form are not sufficiently equal in energy content to meet with the requirements of the utilizing apparatus.

A feature of this invention is to provide a system whereby a truly balanced wave form is available.

Another feature of this invention is to provide a system wherein a balanced wave form may be provided at the instant it is desired.

An object of this invention is to provide a balanced wave form generator having a novel and unique design.

These and other objects and features of the invention are provided in a wave form generator wherein a first pulse generator in response to an input signal generates a first portion of the wave form. A second pulse generator is maintained inoperative as the result of a signal which is generated simultaneously with the first signal and has a duration equal thereto. The output of the first pulse generator is applied to an integrating system which establishes a voltage level representative of the area or integral of the area of the first wave shape portion. Means, in the form of a comparator, is responsive to the output of the integrating circuit to provide a signal which actuates the second pulse generator when the first pulse generator ceases operation. This occurs when the enabling and disabling signals respectively applied to the first and second generators terminate. This output of the second pulse generator is applied to the integrator in opposite polarity. Accordingly, the level of the integrator decreases until it reaches substantially zero, at which time the operation of the second pulse generator is terminated. Accordingly, the output from the first and second pulse generators is a wave form in which both positive and negative halves are balanced.

The novel features of the invention, as well as the invention itself, both as to its organization and method of operation, will best be understood from the following description when read in connection with the accompanying drawings, in which Figure 1 is illustrative of a balanced wave form of the type desired, and Figure 2 is a circuit diagram illustrating an embodiment of the invention.

Figure 1 shows a balanced wave form. At the inception no current flows. Then a positive rectangular pulse is generated during an interval $T_1$. This is followed by a negative rectangular pulse immediately upon the fall of the positive rectangular pulse. The interval of the negative rectangular pulse is $T_2$. When the negative rectangular pulse terminates at the end of $T_2$ there is no further current. If this wave shape is for current, then $$\int_0^{T_1+T_2} i dt = 0$$

If the waveshape is for voltage, then $$\int_0^{T_1+T_2} e dt = 0$$

Figure 2 shows the embodiment of the invention in circuit diagram form. This comprises a first and a second electron discharge tube 10, 20 which are respectively the first and second pulse generators. The anodes 12, 22 of these tubes are connected to the end of the primary winding 32 of a transformer 30. The primary winding is center tapped and B+ is applied to these tubes through this center tap. The grid 14, 24 of each tube is connected to the anode of a separate diode 18, 28. The cathodes of these diodes are connected together and to the slider of a potentiometer. This potentiometer is connected between B+ and ground. Accordingly, the potential derived from the potentiometer determines the point at which or beyond which the potential applied to the control grids of the first and second tubes cannot rise. In other words, the diodes and potentiometer establish the clamping potential of the control grids of the first and second tubes.

A first control tube 40 has its anode 42 connected to the grid 14 of the first tube 10. An anode load resistor 48 provides operating potential to its plate 42. Its control grid 44 is returned to ground through a grid leak resistor 45 and its cathode 46 is connected to a source of negative potential. Accordingly, this first control tube 40 is normally conducting heavily and thus holds the first tube 10 non-conductive by virtue of the fact that the anode potential of the control tube biases the control grid of the first tube below its cathode.

A second control tube 50 is provided and, similarly to the first control tube, has its anode 52 connected to the grid 24 of the second tube and to an anode load 58. This tube is biased to the cut-off in standby conditions by virtue of the fact that its control grid 54 is returned to a negative potential via a grid bias resistor 55 which makes the grid of the tube more negative than its cathode. A third control tube 60 is connected with its anode 62 to the anode 52 of the second control tube 50 and its cathode 66 to the cathode 56 of the second control tube 50. Its grid 64 receives a positive potential from a comparator 80 so that the tube is normally conducting.

The secondary 34 of the transformer 30 is connected to a video amplifier 70. This video amplifier is of a type well known in the art and may be found described on page 71 et seqq. in Vacuum Tube Amplifiers, by Valley and Wallman, published by McGraw Hill Book Company. A typical example is shown on page 110. The output of the video amplifier is coupled to a "Miller" integrator circuit 72. This is of the well known type which has a feedback condenser between the anode and grid of the integrating tube. A detailed description of an integrator of a suitable type may be found on page 37 of Wave Forms, by Chance et al., published by McGraw Hill Book Company. The output of the integrator is coupled to a comparator circuit 80. Comparator circuits are described on page 335 et seqq. of the above indicated book, Wave Forms. A suitable circuit is shown and described on page 341, with the single change that the inductance 2100 should be replaced by a resistor.

This circuit will generate a negative output pulse responsive to an input from the integrator circuit which exceeds a certain desired predetermined level. The negative output from the comparator is maintained until the level from the integrator drops below the predetermined level, at which time its output goes positive. The comparator output is applied to the grid 64 of the third control tube 60. The grids 44, 54 of the first and second control tubes are respectively connected to receive the output from a first univibrator 82. A univibrator is defined as a monostable multivibrator. It is well known in the art and may be found described in the above indicated book, Wave Forms, on page 166 et seqq. More specifically, a univibrator may consist of two tubes having a common cathode coupling and a common cathode load. The anode of the first of the two tubes is connected by means of a condenser to the grid of the second of the two tubes. The tubes are normally biased so that the first tube is conductive and the second tube is biased off as a result of the cathode bias caused by the first conducting tube. A negative signal applied to the grid of the first tube causes an exchange of conduction between the two tubes for a time determined by the value of the coupling condenser and the plate resistor of the first tube. The first control tube is coupled to the one of the two univibrator tubes which goes negative and the second control tube is coupled to the one of the univibrator tubes which goes positive when the univibrator is tripped from its stable to its unstable state.

A second univibrator 84 has its input connected in parallel with the first univibrator so as to be triggered simultaneously therewith upon the application of an input pulse. The positive output of the second univibrator 84 (the one of the two tubes which goes positive during the unstable state) is applied to the suppressor grid 74 of the integrator. Accordingly, the integrator tube in the standby condition is not conductive and will stay in this condition until it receives a gating input from the second univibrator. The period of operation of the second univibrator is made to be at least fifty percent in excess of twice the period of operation of the first univibrator. The unstable condition or period of operation of the first univibrator is made to have a duration equal to the desired balanced wave form width. In other words, the first univibrator will be in its unstable condition during the period $T_1$ (referring to Fig. 1). The second univibrator will be in its unstable condition during a period in excess of $T_1$ and $T_2$.

To operate the wave form generator, an input pulse is applied to both univibrators 82, 84 simultaneously. This has the effect of (1) causing the first control tube 40 to become non-conductive due to the application of a negative pulse to its grid, (2) causing the second control tube 50 to become conductive due to the application of positive pulse to its grid, and (3) permitting the integrator circuit 72 to become operative due to the application of a positive pulse to its suppressor grid.

The first tube grid 14 will receive a positive signal from the anode of the now non-conductive first control tube which will permit the first tube 10 to become conductive. The limit of the positive signal and therefore the limit of current conduction of the first tube is determined by the amplitude of the voltage to which the clamping diode 18 connected to its grid is biased. Furthermore, another limit on the amount of current which is drawn by the tube is determined by the cathode load resistor connected in the cathode circuit. The positive pulse applied to the second control tube 50 maintains this tube conducting and therefore any activity by the third control tube 60 will not affect the second pulse generator. The output from the secondary winding 34 of the transformer is applied to the video amplifier, 70, and the video amplifier applies its output to the integrator.

The integrator starts to operate and its anode potential commences to drop. This causes the comparator 80 to operate in response thereto. The comparator applies a negative signal to the grid of the third control tube which tends to cut it off. However, this has no effect on the operation of the second tube 20 in view of the large positive signal being applied to the control grid 54 of the second control tube which holds it conductive.

At the termination of the pulse output from the first univibrator 82, the first control tube 40 immediately goes conductive, thus cutting off the current flow in the first tube 10. The second control tube 50 becomes non-conductive due to the removal of the positive pulse from its grid. The third control tube 60 is already non-conductive due to the negative signal being applied to its grid by the comparator. Thus a positive potential is instantaneously applied to the control grid 24 of the second tube 20. The amplitude of this positive potential is limited by the clamping diode 28. The current drawn by the second tube is also determined by the cathode load resistor in its cathode circuit. The current drawn by the second tube induces a potential of opposite polarity in the secondary of the transformer 30. This is applied, after amplification by the video amplifier, to the grid of the integrator tube. The effect of this is to cause the integrator to integrate negatively, thus increasing the potential at the anode of the integrator tube. This continues until the output from the integrator tube returns to its previous starting level, at which time the comparator also returns to its initial condition. The third control tube immediately resumes its conduction, thus dropping the potential being applied to the second tube grid to a value which drives it to cut off.

After a time, as determined by the duration of the unstable condition of the second univibrator 84, the integrator circuit is disabled. In the above described operation, the output from the first univibrator enables an output pulse from the first tube which is integrated. This integrated value is used to measure the duration of the output from the second tube. Accordingly, the output pulse from the second tube will have an area which is exactly equal to the area of the output pulse from the first tube.

Of course, variations in the current drawn by the respective tubes may be made by varying the clamping bias applied to the grids as well as the size of the cathode lead resistors. The fact remains, however, that the duration of the pulse comprising the second or negative half of the wave form will be determined by the integral of the area of the first pulse or positive half of the wave form. To make the wave form exactly balanced, the voltage applied to the clamping diodes is made identical, as are the cathode load resistors in the two tubes. Since the total change of the integrator is over the entire wave form, the wave form must be perfectly balanced. If the resistor connected between one end of the secondary of the transformer and ground is omitted, and the output from the transformer secondary is directly applied to the input of the video amplifier, the system can be used to produce a balanced voltage output instead of a balanced current output. Furthermore, the input to the video amplifier need not be taken directly from the transformer, but may be taken from the output of apparatus which is driven by the transformer. This will insure that the output from such apparatus is a balanced wave form.

There has thus been shown and described a novel, useful, balanced wave form generator in which an integrator is used in a feedback loop to control the length of the second half of a wave form so that the two halves of the wave form are always accurately balanced.

What is claimed is:

1. A waveform generator comprising means to generate a first portion of said waveform, integrating means to establish a voltage level which is a representative measure of said waveform, means to commence the generation of a second portion of said waveform at the termination of said first portion, means to apply a voltage responsive to the generation of said second portion to said integrating means to reduce said voltage level, and means to terminate the operation of said means to generate said second portion when said voltage level is reduced to a desired minimum value.

2. A waveform generator comprising means to generate a first portion of said waveform, integrating means, means to apply the output of said first waveform portion generating means with one polarity to said integrating means, means to generate a second portion of said waveform responsive to the termination of said first portion, means to apply the output of said second waveform portion generating means with an opposite polarity to said integrating means, and means to terminate the operation of said second waveform portion generating means responsive to a desired output level from said integrating means.

3. A waveform generator comprising a first pulse generator, a second pulse generator, means to apply signals to initiate operation of said first pulse generator to hold said second pulse generator inoperative, integrating means, means to apply said first pulse generator output with one polarity to said integrating means, means responsive to an output from said integrating means to render said second pulse generator operative subject to the control exercised by said means to apply signals, and means to apply said second pulse generator output with an opposite polarity to said integrating means.

4. A waveform generator comprising a first pulse generator, a second pulse generator, a first means to control said first pulse generator, a second means to control said second pulse generator, a third means to control said second pulse generator, means to apply a first signal to said first means to render said first pulse generator operative and a second signal of equal duration to said first signal to maintain said second pulse generator inoperative, an integrator, means to apply the output of said first pulse generator to said integrator, means to apply output from said integrator to said third means to render said second pulse generator operative upon the termination of said second signal, and means to apply the output of said second pulse generator to said integrator with an opposite polarity to the output of said first pulse generator.

5. A balanced waveform generator comprising a first and a second electron discharge tube having anode, cathode and control grid, a transformer having a center tapped primary and a secondary winding, said primary winding being connected between the anodes of said first and second tubes, means to apply operating potential to the center tap of said primary winding, a first means to control said first tube, a second means to control said second tube, a third means to control said second tube, means to apply to said first means a first signal to render said first tube conductive and to said second means a second signal to maintain said second tube non-conductive, an integrating system, means to couple output from said transformer primary to said integrating system, and means responsive to an output from said integrating system to apply a signal to said third means to render said second tube conductive upon termination of said second signal.

6. A balanced waveform generator as recited in claim 5 wherein said first, second and third control means each includes an electron discharge tube having anode, cathode and control grid, an anode load resistor connected to the anode of said tube in said first control means, an anode load resistor connected to the anodes of said tube in said second and third control means, the control grid of said first tube being connected to the anode of said tube in said first control means, the control grid of said second tube being connected to the anodes of the others of said tubes, and means to bias said tube in said first control means and said tube in said third control means to be conductive in standby condition.

7. A balanced waveform generator comprising a first and a second electron discharge tube having anode, cathode and control grid, a transformer having a center tapped primary and a secondary winding, said primary winding being connected between the anodes of said first and second tubes, means to apply operating potential to the center tap of said primary winding, first, second and third control tubes each having anode, cathode and control grid electrode, first and second anode loads respectively connected to the anodes of said first control tube and said second and third control tube, said first control tube anode being connected to the control grid of said first tube, said second and third control tube anodes being connected to the control grid of said second tube, means to bias said first and third control tubes to be conductive in standby condition, an integrating circuit, including means to maintain said integrating circuit inactive in standby condition, means to couple said transformer primary to said integrating circuit input, comparator means responsive to an output from said integrating circuit to apply a signal to the control grid of said third control tube to render said tube conductive, means responsive to an input pulse to apply a first signal to said first control tube grid to render said first control tube non-conductive and to apply a second signal of equal duration to said first signal to the control grid of said second control tube to maintain said second control tube conducting, and means responsive to said input pulse to apply a third signal to said integrating circuit to render it operative for a time longer than twice the duration of said first signal whereby a balanced waveform is produced in said transformer primary winding.

References Cited in the file of this patent

UNITED STATES PATENTS

| | | |
|---|---|---|
| 2,258,752 | Fewings | Oct. 14, 1941 |
| 2,362,503 | Scott | Nov. 14, 1941 |
| 2,402,916 | Schroeder | June 25, 1946 |
| 2,535,266 | Chance | Dec. 26, 1950 |
| 2,560,709 | Woodward | July 17, 1951 |